United States Patent [19]

Jeffrey, Jr. et al.

[11] Patent Number: 5,003,941
[45] Date of Patent: Apr. 2, 1991

[54] ENGINE HEATING UNIT

[76] Inventors: Roy R. Jeffrey, Jr., 1706 Ellison St.; John Devoss, 801 Floydada St., both of Wellington, Tex. 79095

[21] Appl. No.: 532,742

[22] Filed: Jun. 4, 1990

[51] Int. Cl.$^5$ ............................................. F02M 17/02
[52] U.S. Cl. ............................................. 123/142.5 R
[58] Field of Search .................. 123/142.54, 41.14; 165/104 S

[56] References Cited

U.S. PATENT DOCUMENTS

| | | | |
|---|---|---|---|
| 2,616,412 | 11/1952 | Backus | 126/101 |
| 3,236,220 | 2/1966 | Holmes | 123/142.5 R |
| 3,777,975 | 12/1973 | Kofink | 237/12.3 R |
| 4,010,895 | 3/1977 | Kofink | 237/12.3 C |
| 4,258,677 | 3/1981 | Sanders | 123/142.5 R |
| 4,520,769 | 6/1985 | Kratzer | 123/142.5 R |
| 4,590,838 | 5/1986 | Mosig | 122/149 |
| 4,718,600 | 1/1988 | Adam | 237/2 A |

OTHER PUBLICATIONS

Kaowool "Firemaster" Fire Protection Systems Brochure by Morgan Thermal Ceramics. Copyright 1988—pp. 2-7.

Primary Examiner—E. Rollins Cross
Attorney, Agent, or Firm—John F. Bryan, Jr.

[57] ABSTRACT

A liquidified gas fired system facilitates starting of an internal combustion engine by external heating of the engine coolant and fuel so as to allow periodic shut down in cold weather. The system includes an engine coolant heat exchanger inside a refractory lined fire-box which is heated to incandescent temperatures. Both engine coolant and liquified gas are preheated by regenerative cooling of the combustion products and an auxiliary gas heater is providded for unassisted cold starting of the system.

35 Claims, 5 Drawing Sheets

ENGINE HEATING UNIT

TECHNICAL FIELD

This invention pertains to a system and apparatus for externally preheating the liquid coolant and fuel of an internal combustion engine in cold weather so as to facilitate restarting after an extended shut down period.

BACKGROUND AND SUMMARY

Cold weather adversely affects the starting of internal combustion engines, most particularly diesel engines, for several temperature related reasons. Inasmuch as diesel engines heat the fuel/air mixture by compression, it becomes increasingly difficult to achieve ignition temperature as ambient temperatures fall and diesel fuel will gel at any temperature much below 0 degrees F. Lubricating oils and diesel fuels also become more viscous at lower temperatures. There is a range of variation with compounding, but 15W40 motor oil for instance, becomes semi-solid at −20 degrees F., and 10W30 at −35 degrees F. As oil viscosity becomes greater it begins to impede, rather than lubricate, the movement of parts, especially of the pistons. Add to these factors an electric starting system having diminished output at low temperatures, and it will be appreciated that a diesel engine can become virtually unstartable when temperatures fall much below freezing.

A need for some viable engine preheating means has been recognized for many years, as evidenced by prior efforts to make such a system, but none have enjoyed any notable acceptance in the market. These devices include the examples shown in U.S. Pat. Nos. 2,616,412; 4,010,895 and 4,520,769.

The common cold weather practice has been to leave a diesel engine running at idle, even for extended periods, rather than to risk the effort of restarting. A good argument has been made that this is more economical and less stressful to an engine, but environmental awareness is causing a reevaluation of the practice. Certainly, a great quantity of fuel is burned, and the products of combustion released into the atmosphere, for the sole purpose of coping with this cold starting problem.

The Environmental Protective Agency is expected to address this practice on a national basis in pending "Clean Air" legislation, requiring that it be severely restricted or eliminated altogether. Already we have the advent of local legislation, such as in Denver, Colorado, where operators are limited to running the engines of parked vehicles for only 15 minutes of each hour.

There is a clear need for a practical, environmentally acceptable, engine heating system to maintain or restore operating temperatures in a completely safe and economical manner. To be both functional and acceptable for general use this system is must:
1. Be efficient;
2. Be capable of continuous, independent operation;
3. Operate in extreme conditions of cold and wind;
4. Warm the engine fuel as well as coolant; and
5. Be safe.

It is the object of the present invention to fulfill each of these requirements. Propane, or liquid natural gas (LNG) fired heating systems are well-known to the art, are inherently self-sufficient and have been proven to be safe and reliable. Gasoline fired systems are also quite feasible for this application but, on the basis of safety related considerations, a propane (LNG) fired system is considered to be somewhat better suited.

Efficiency includes, but goes well beyond operating cost, since a compact size is needed in order to have an acceptable cowl mounted unit. Moreover, this unit must be capable of heating an engine of 400 HP or more without reaching unsafe external temperatures. The required thermal efficiency is achieved in the present invention by passing the coolant heat exchange means through a fire-box held at temperatures in excess of 900 degrees F. Such temperatures serve to concentrate the potential for rapid heat exchange in a relatively small unit. This function is facilitated by radiant heat from an incandescent refractor fire-box lining which, along with direct flame exposure, involves the full surface area of the coolant heat exchanger. Refractory materials in general reach red incandescence as temperature increases to 900 degrees F., progressing through cherry red at 1,200 degrees and orange at 1,300 degrees, to a white range at 1,550 degrees and above, becoming a brilliant white at 1,750 degrees. The present invention functions anywhere in this range, but has proven more efficient at the higher temperatures.

The refractory lining properties are critical to proper functioning of this unit. This material must reach an incandescent red or white hot condition quickly with a relatively low heat input, and also provide thermal insulation so that conduction losses from the fire-box are minimized. There is no risk of heat exchanger burn-out, even with a fire-box temperature of 1,750 degrees F., so long as care is taken to assure unrestricted coolant flow through the heating unit and back to the engine. It is also essential to avoid a steam trap by having the coolant outlet of the heating unit positioned at a lower elevation than the coolant inlet connection to the engine. Operation at these elevated temperatures allows fire-box size to be reduced accordingly and is considered to be a significant aspect of the invention.

The combustion gases pass down from the fire-box to a lower section where they are partially cooled while preheating incoming coolant. These gases are then passed over the propane (LNG) tank where the remaining heat helps to maintain supply pressure. Means for heating fuel are included in the heating unit. Air circulating through an outer jacket serves both to cool external surfaces and to provide a source for cab heat if it is desired.

The engine radiator provides an abundant excess of cooling capacity when the engine thermostat opens, and thus gives inherent protection from overheating should the heating unit output be excessive. A test unit, using a flame set so that the thermostat opened only slightly, has kept a 400 HP engine warm for as long as 18 hours, in −7 degree F. ambient conditions, while burning one 2½ gallon propane tank, and better performance is anticipated of later models. This same test unit has performed well at altitudes of 10,500 feet and in 40 mph blizzards.

DETAILED DESCRIPTION OF THE INVENTION

Figure 1:
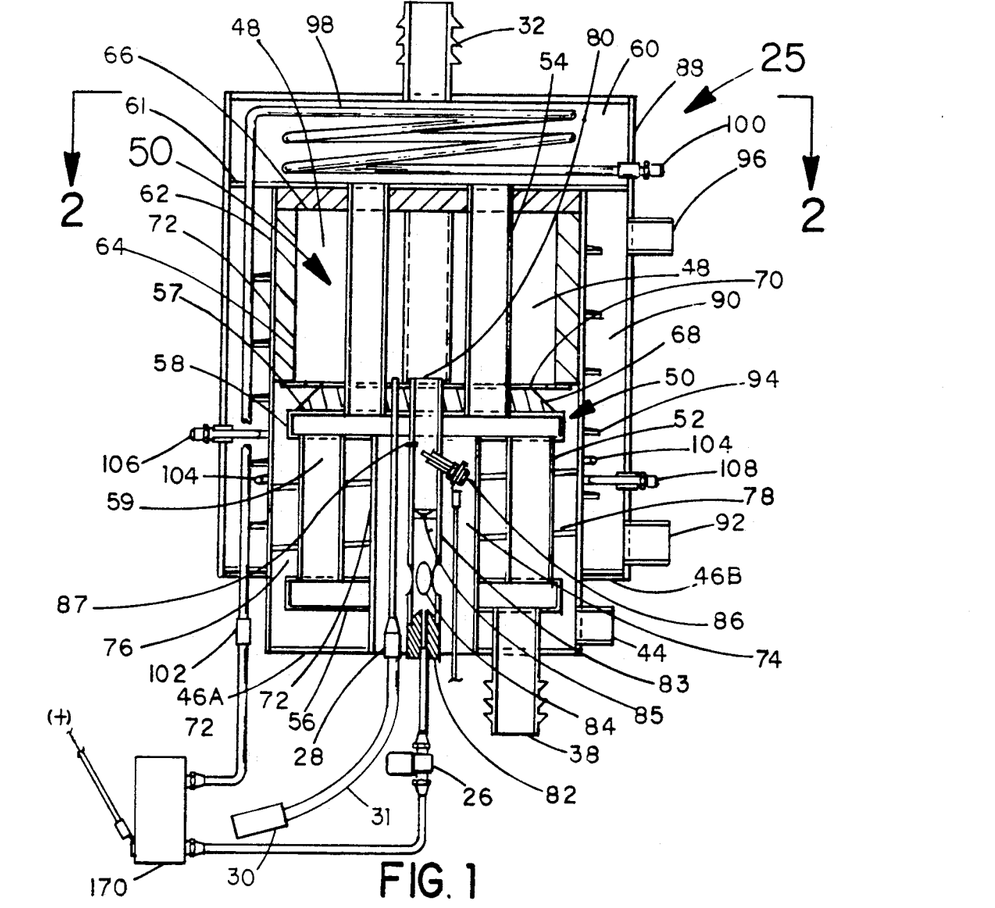
FIG. 1 shows a section view of the fire-box as used in the preferred embodiment of the invention.
Figure 2:
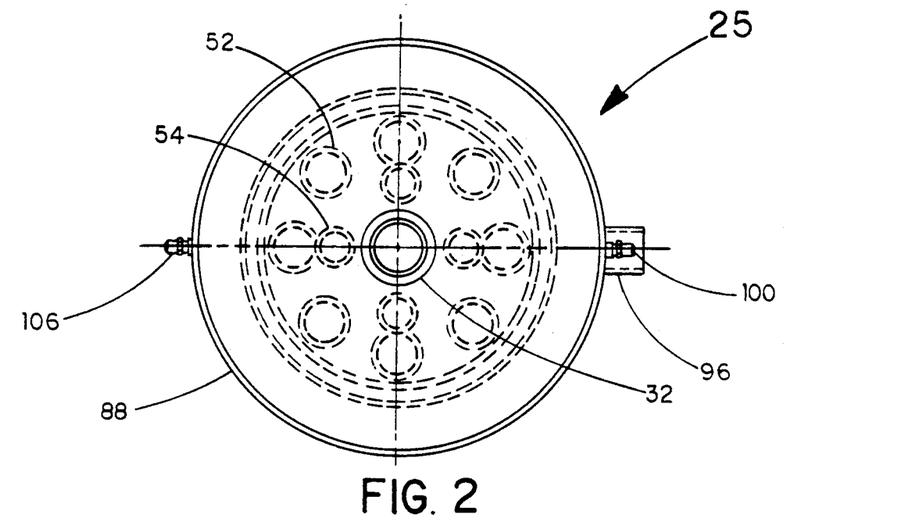
FIG. 2 shows a section view of the preferred embodiment of the invention of FIG. 1 taken along the line 2—2.

The invention comprises a system 110 of which the key component is the heating unit 25, shown in its preferred embodiment in FIGS. 1 and 2. The heating unit 25 is made around a liquid heat exchanging means 50, in this case, taking the form of a ring of parallel preheat tubes 52 and a second ring of parallel fire-box tubes 54. There are approximately twice as many preheat tubes 52, in a proportionately larger ring, and they may also be of a larger diameter than the fire-box tubes 54. The lower ends of preheat tubes 52 join into inlet tank 56, and the upper ends of these tubes join into connecting tank 58. The lower ends of fire-box tubes 54 also join into connecting tank 58 while the upper ends join into outlet tank 60. The inlet tank 56 and connecting tank 58 have open center areas while outlet tank 60 does not. The liquid coolant enters heat exchanging means 50 through coolant inlet 38 of inlet tank 56, which extends through bottom plate 46A, and exits through hot coolant outlet 32 of outlet tank 60.

Inner housing 62 is attached to the under side of outlet tank 60 and extends down to bottom plate 46, surrounding but not contacting the fire-box tubes 54, connecting tank 58, preheat tubes 52 and inlet tank 56. That portion of inner housing 62 covering fire-box tubes 54 is shielded by refractory liner 64. The under surface 61 of outlet tank 60 is covered with refractory liner 66 cut to fit around the fire-box tubes 54. The upper surface 57 of connecting tank 58 is covered in a similar manner by refractory liner 68. The refractory liners 64, 66 and 68 are held in place by perforated retaining ring 70, so made to pass combustion gases, and the volume thus enclosed is the fire-box 48.

Ceramic wool, commercially available as "Kaowool FireMaster Blanket" from Morgan Thermal Ceramics of Augusta, Georgia, which is normally used as an external fireproof protective blanket for cable trays, ducts and the like, has proven to be a suitable refractory material. Kaowool is an alumina/silica ceramic fiber, and testing of numerous other conventional refractory materials indicated the fibrous nature of Kaowool to be conducive to reaching incandescence quickly with relatively low thermal input as is required by this application.

Inner wall 72 extends from the under surface 59 of connecting tank 58 to bottom plate 46, forming the burner cavity 74 and enclosing the preheat chamber 76. Combustion gases exit the fire-box 48, passing through perforated retaining ring 70, and are deflected by vanes 78 to pass through and around preheat tubes 52 before exiting preheat chamber 76 by way of exhaust outlet 44.

Preheat tubes 52, being more numerous and larger, pass coolant at a slower rate than fire-box tubes 54, allowing more time for heat absorption from the relatively cooler combustion gases. It is also notable that the combustion gases flow downwardly while the coolant flows upwardly, so that the temperature differential between these media, and hence the heat transfer rate therebetween, is maintained. The combustion gases are cooled to a safe temperature of approximately 125 degrees F. by the time they leave the heating unit 25.

Burner assembly 80 extends through the burner cavity 74, and fits closely inside the center opening of connecting tank 58. Burner assembly 80 is of a conventional design well-known to the art, with gas jet 82 at the lower end of mixing tube 83. Mixing tube 83 has air inlet openings 84 so that propane (LNG) and air form a combustible mixture and metering venturi 85 just above gas jet 82. This mixture is ignited by striker 86 which arcs across to contact 87 at the upper portion of mixing tube 83 above venturi 85. The supply of gas to gas jet 82 is controlled by LP gas solenoid valve 26, commercially available from Beam Products Manufacturing Co. in Los Angeles, Calif. as part no. L-416. Probe tube 28 extends through connecting tank 58 into fire-box 48 so as to provide access for optical sensor 30 which controls LP gas solenoid valve 26, shutting off the flow of gas as a safety measure if, for any reason, the flame should go out. Optical sensor 30 is a commercially available photoelectric unit made by Warner Electric Col. of South Beloit, Ill. as part no. MCS-657-12 and it is connected to probe tube 28 by optical extension 31, which is also a Warner Electric Co. item, part no. MCS-658-RAN. The vertical, downward opening orientation of the burner cavity 74 allows ventilation of the heavier-than-air propane (LNG) gases in case of flooding. A top fired version of fire-box 48 would be hard to clear if flooded, and potentially hazardous.

Outer housing 88 extends from the outlet tank 60 to bottom plate 46B, forming an annular air jacket 90 through which air is circulated by convection, drawn through air inlet 92 and guided by vanes 94 along a spiral path to be discharged at air outlet 96. This air serves to further cool the exterior of heating unit 25 and may be utilized to warm an operator's cab if so desired.

Preheating line 98, with inlet 100 and outlet 102, passes propane (LNG) through the hot coolant in outlet tank 60 and thence through air jacket 90 for gasification. Fuel heating coil 104, with inlet 106 and outlet 108 lies closely around inner housing 62 within air jacket 90 to provide means for heating engine fuel.

Figure 3:
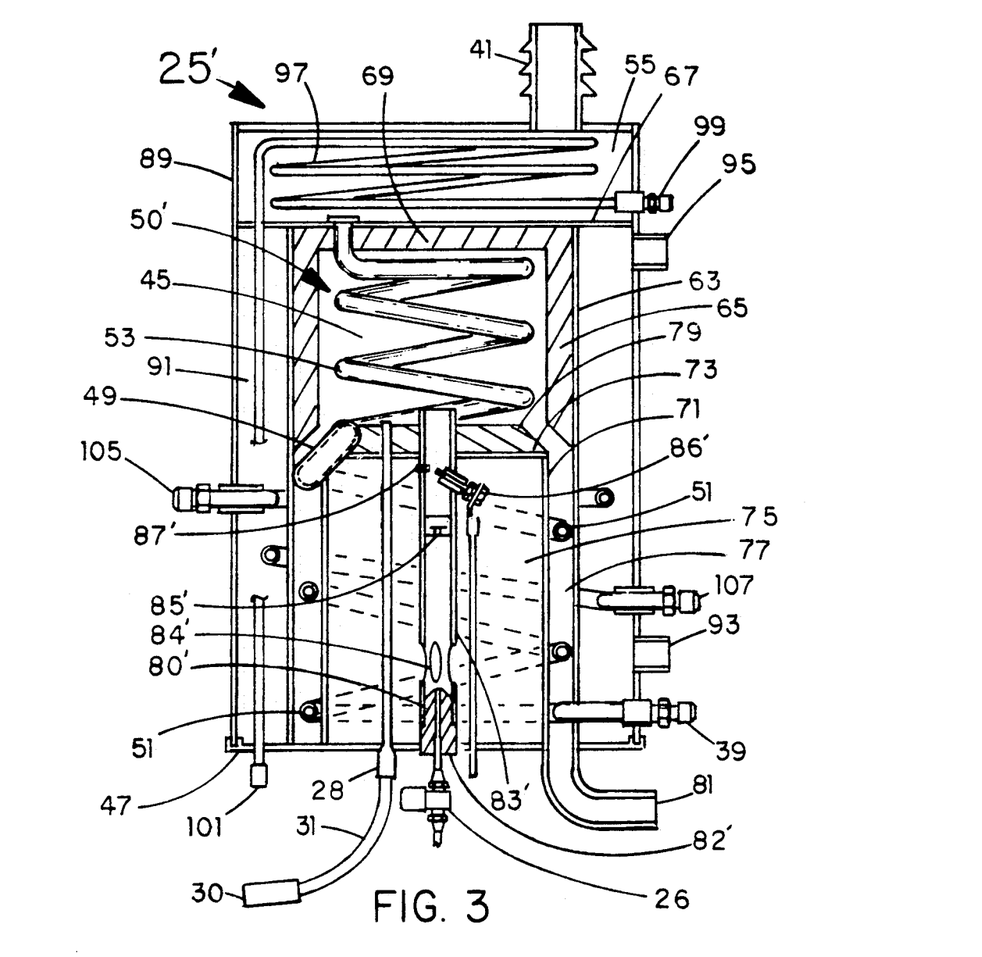
FIG. 3 shows a section view of the fire-box as used in an alternate embodiment of the invention.

An alternate embodiment of heating unit 25' is shown in FIG. 3 where heat exchanger means 50' comprises preheat coil 51 connected to fire-box coil 53 by connecting tube 49. Preheat coil 51 is somewhat larger in overall diameter than fire-box coil 53 and the common axis of both coils is vertically oriented. The upper end of fire-box coil 53 feeds into the flattened, round outlet tank 55, which is somewhat larger in diameter than the overall dimension of preheat coil 51.

Inner housing 63 is attached to the under side of outlet tank 55 and extends down to bottom plate 47 which lies below the lowest portion of preheat coil 51, surrounding but not contacting the fire-box coil 53 and fitting closely over preheat coil 51. That portion of inner housing 63 around fire-box coil 53 is shielded by refractory liner 65 and the under surface 67 of outlet tank 55 is covered with refractory liner 69. Inner wall 71, closely fitting the inside diameter of preheat coil 51, extends from bottom plate 47 to partition 73 which is located just above the upper turn of preheat coil 51, so as to form the burner cavity 75 and enclose the preheat section 77. The upper surface of partition 73 is covered by refractory liner 79 so that the refractory liners 65, 69 and 79 enclose the volume of fire-box 45.

Outer housing 89 extends from the outlet tank 55 to bottom plate 47, forming an annular air jacket 91 through which air is circulated by convection, drawn through air inlet 93 and discharged at air outlet 95. This air serves to further cool the exterior of heating unit 25' and is available to warm an operator's cab if so desired.

Preheating line 97, with inlet 99 and outlet 101, passes propane (LNG) through the hot coolant in outlet tank 55 and thence through air jacket 91 for gasification. Fuel heating coil 103, with inlet 105 and outlet 107 lies closely around inner housing 63 within air jacket 91 to provide means for heating engine fuel.

Burner assembly 80' extends through the burner cavity 75, and fits closely inside a center opening of partition 73. Burner assembly 80' is identical to burner assembly 80 of FIG. 1, with gas jet 82' at the lower end of mixing tube 83'. Mixing tube 83' has air inlet openings 84' so that propane (LNG) and air form a combustible mixture and metering venturi 85' just above gas jet 82'. This mixture is ignited by striker 86' which arcs across to contact 87' at the upper portion of mixing tube 83' above venture 85'. The supply of gas to gas jet 82' is controlled by LP gas solenoid valve 26', the same part as in FIG. 1. Probe tube 43 extends through partition 73 into fire-box 45 so as to provide access for optical extension 31' and optical sensor 30' which controls LP gas solenoid valve 26' in the same manner as in FIG. 1.

Figure 3A:
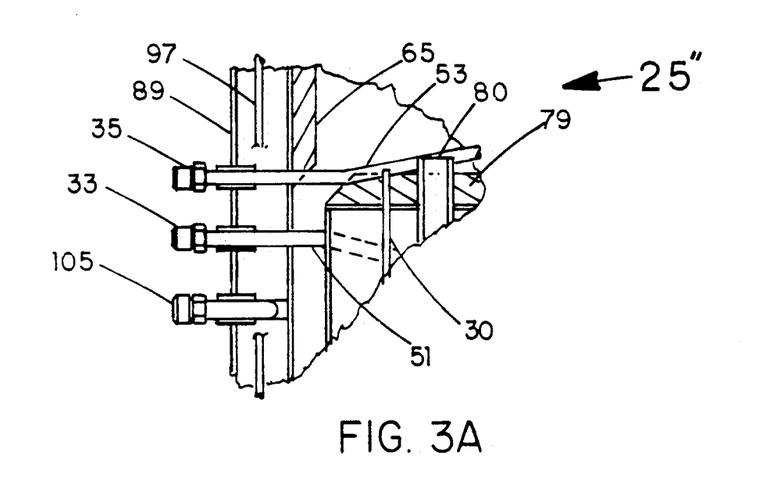
FIG. 3A shows alternate engine coolant flow connections as applied to the embodiment of FIG. 3.

Combustion gases exit the fire-box 45, passing into preheat section 77, and are guided by the turns of preheat coil 51 to follow an extended spiral path before exiting preheat section 77 by way of exhaust outlet 81. The liquid 10 coolant enters heat exchanging means 50' through coolant inlet 39, which extends through bottom plate 47, and exits through hot coolant outlet 41 of outlet tank 55. It is structurally convenient to circulate the same coolant volume through the preheat coil 51 and then through the fire-box coil 53, however the heating unit 25' would work equally well with completely separate coolant flow paths for each of these coils. Such an arrangement is shown in FIG. 3A where connecting tube 49 is deleted in favor of coolant inlet connection 35 which brings engine coolant directly into fire-box coil 53, and coolant return connection 33 which carries engine coolant from preheat coil 51 back to the engine.

Figure 4:
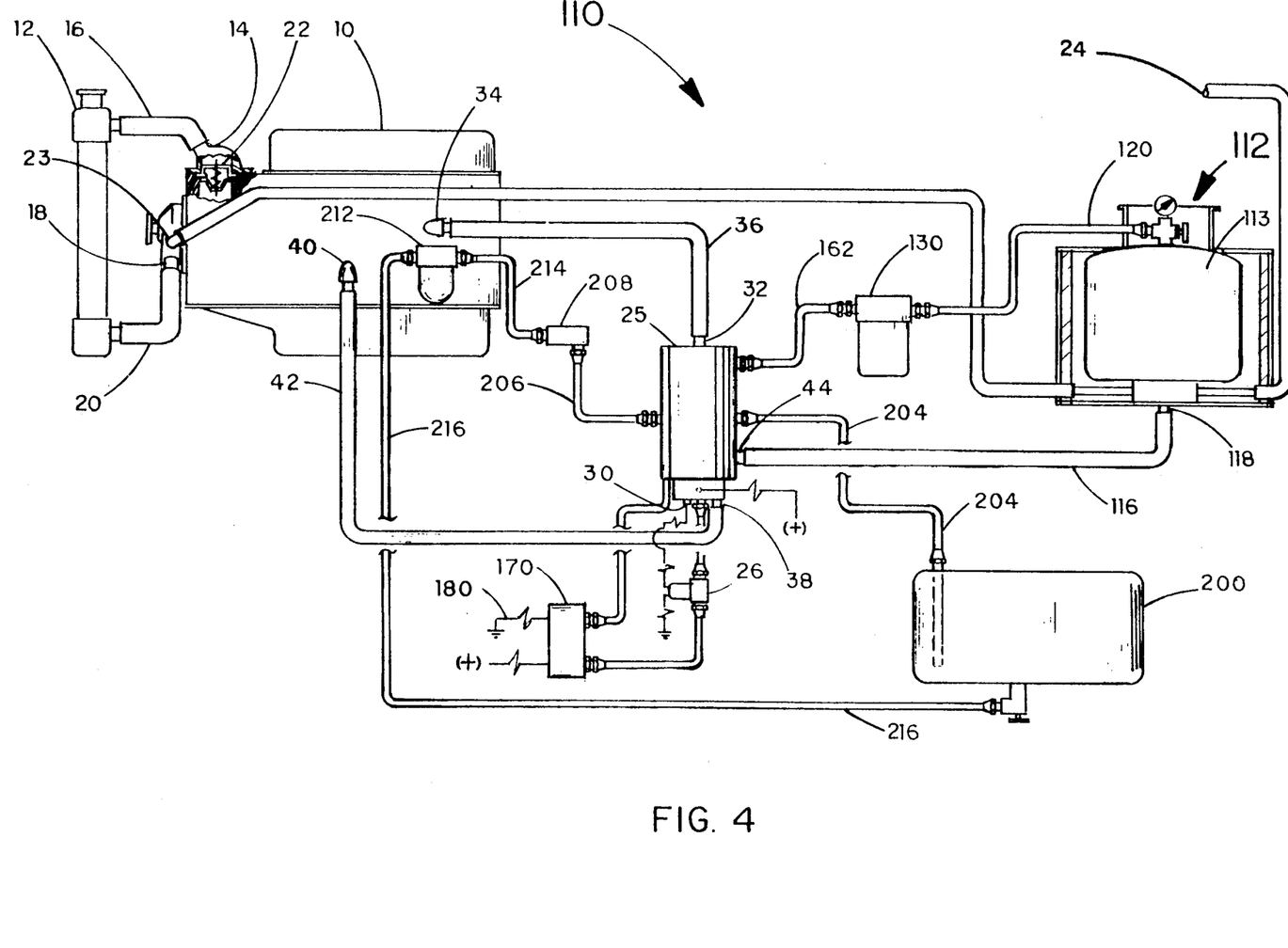
FIG. 4 illustrates the arrangement of the heating system in a typical engine installation.

The present invention is more fully disclosed in FIG. 4 as system 110. The engine 10 is a conventional liquid cooled internal combustion engine having a radiator 12 connected to the engine coolant outlet 14 by upper radiator hose 16 and to engine coolant inlet 18 by lower radiator hose 20. Thermostatic bypass valve 22 opens when the liquid coolant temperature exceeds a preset figure, usually somewhat under 200 degrees F., allowing coolant circulation through radiator 12.

The heating unit 25 has a hot coolant outlet 32 which connects to a hot coolant inlet 34 by means of connecting hose 36, and a coolant inlet 38 which connects to the engine coolant outlet 40 by means of a second connecting hose 42. Coolant outlet 32 is always located at a lower level than hot coolant inlet 34, to promote convection circulation of the coolant, and connecting hose 36 must have no elevated section which could form a steam trap.

The system propane (LNG) supply unit 112 is heated by combustion gases from the heating unit 25. These combustion gases exit the heating unit 25 at exhaust outlet 44 and are carried through exhaust pipe 116 to exhaust inlet 118 where they enter supply unit 112 so as to warm the propane to maintain operating pressure. Under this pressure, propane (LNG) flows from supply unit 112 through supply hose 120 to cold-start unit 130 and thence through connecting hose 162 to heating unit 25.

With compression ignition engines, which comprise the greatest market for this invention, the diesel fuel is passed through heating unit 25 by means of suction line 216 which draws the fuel from engine supply tank 200, and then is routed through fuel filter 212 and connecting line 214 to the inlet of electric fuel pump 208. The fuel is then pumped through connecting line 206 to heating unit 25 where it is warmed and returned to tank 200 via return line 204.

Figure 5:
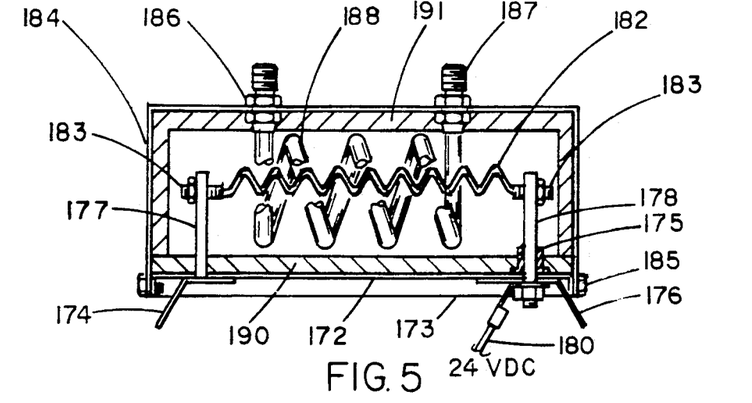
FIG. 5 shows a section view of an electric propane heater as used in the preferred embodiment of the invention.
Figure 6:
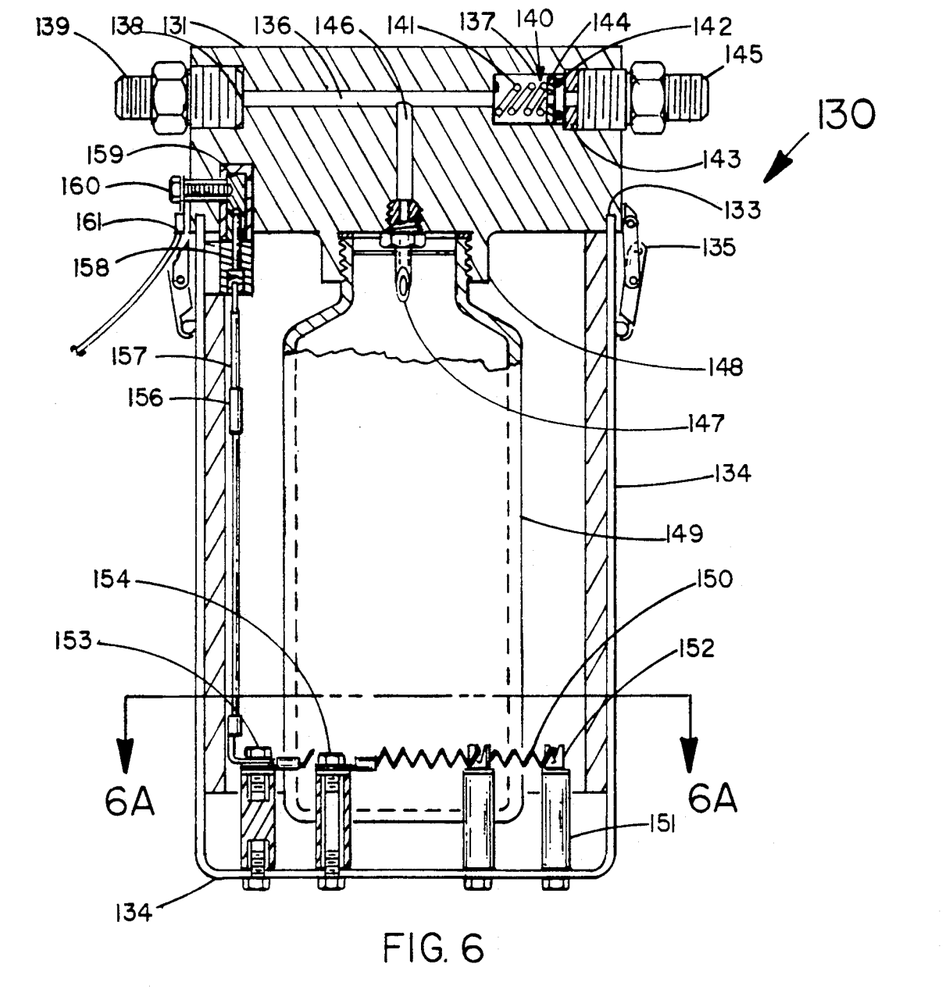
FIG. 6 shows a section view of the auxiliary propane supply as used for cold starting the system in the preferred embodiment of the invention.
Figure 6A:
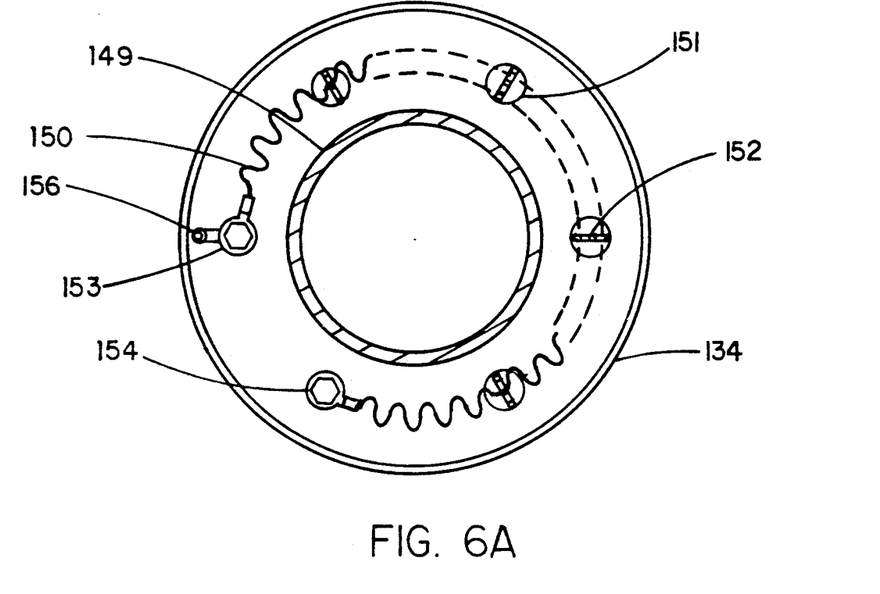
FIG. 6A shows a section view of the auxiliary 20 propane supply of FIG. 6 as taken along lines 6A—6A.
Figure 7:
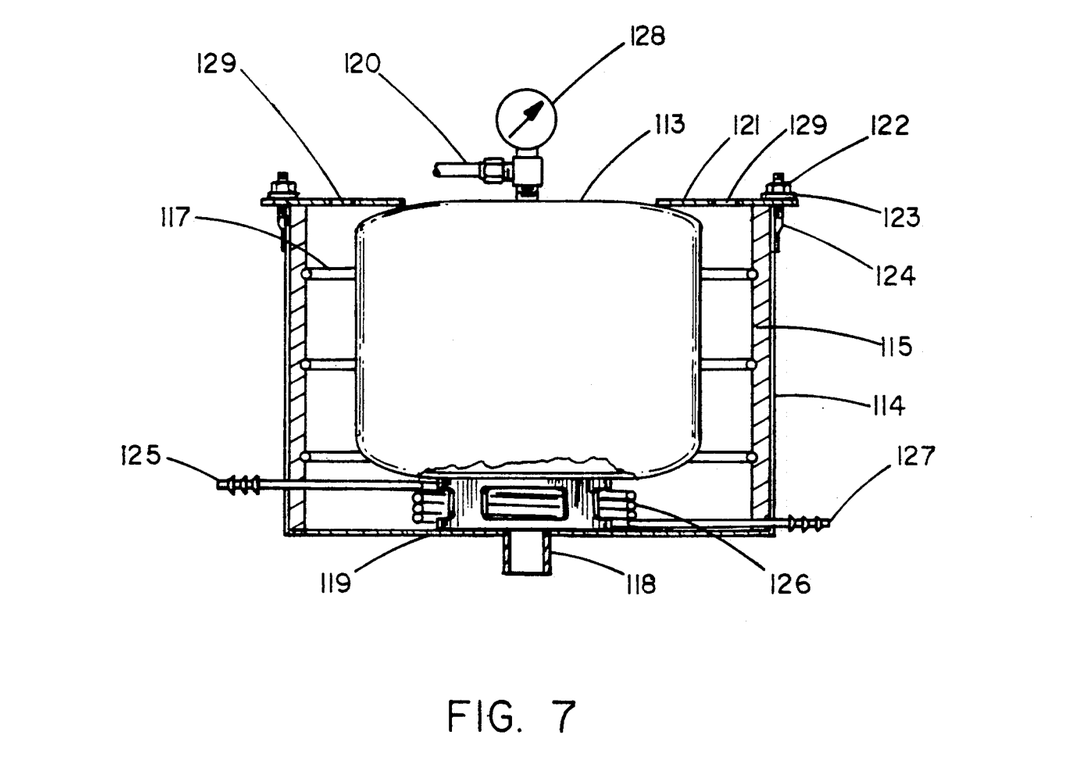
FIG. 7 shows a section view of the main propane supply as used in the preferred embodiment of the invention.

The functioning of the other components of system 110 is described in FIGS. 5-7, wherein FIG. 5 shows the internal construction of the electric propane (LNG) heating unit 170 which assures that propane (LNG) is completely gasified when reaching the burner 80 for safe combustion. Plate 172 with flanged edge 173 provides a base for attachment of mounting brackets 174 and 176 on the outer surface thereof, with ground terminal post 177 and charged terminal post 178 extending from the inner surface thereof. Charged terminal post 178 is isolated from the plate 172 and bracket 176 by insulating bushing 175 and is connected to the battery circuit by electrical wire 180. Resistance coil 182, with terminal contact fittings 183 at each end thereof, is connected across the terminal posts 177 and 178. Cover box 184 is attached to flanged edge 173 with screws 185 so as to enclose and protect resistance coil 182. Bulkhead tube fittings 186 and 187 mounted in the top of cover box 184 provide end connections for propane heating coil 188, which is passed around resistance coil 182. The cover box 184 is insulated with thermal liner 191 and the inner surface of plate 172 is covered with a similar liner 190 in order to better retain heat for warming the propane (LNG).

FIG. 6 shows cold-start unit 130, which is essential if the engine heating system is to be started from a cold condition rather than upon engine shut-down. Manifold block 131 includes locating groove 133 for alignment of housing 134, which is held in place by a plurality of over-center clamps 135. Passage 136 extends through the width of manifold 131, having an inlet end 137 and an outlet end 138, with tube connection adapter 139 installed at the outlet end 138. Passage 136 is enlarged at the inlet end 137 to act as a guide for poppet 144 which, combined with spring 141, seal 142 and seal face 143 comprises check valve assembly 140, with a cracking pressure of approximately 50 psi. Check valve assembly 140 is retained by tube connection adapter 145.

Passage 146 extends downwardly from passage 136, to bayonet fitting 147 at the mutual center of locating groove 133 and threaded coupling 148. A 16 oz. "throwaway" propane battle 149, available from Coleman Company, Inc. of Wichita, Kans., screws into threaded coupling 148, making a leak-tight seal therein, and in so doing is penetrated by bayonet fitting 147 so as to release propane into passage 146.

Resistance element 150, having terminal connectors 153 and 154, is supported on insulated fittings 152 by a plurality of stand-off brackets 151 mounted on the bottom of housing 134 so that it surrounds propane bottle 149 without making contact. Terminal connector 154 is connected directly to one of the stand-off brackets 151, thus forming an electrical ground, while terminal connector 153 is connected by wire 155 to the bimetallic thermal switch 156, well-known in the art, which serves to interrupt current flow to resistance element 150 when the temperature inside of housing 134 reaches 70 degrees F. thus maintaining the temperature of propane bottle 149 at that level. In order to retain this heat, housing 134 is lined with thermal insulation 132 through the upper two-thirds of its height. Wire 157 connects thermal switch 156 to plug connector 158 which engages socket 159 when housing 134 is installed in proper orientation. Socket 159 is connected to insulated terminal 160 which, in turn is connected to the batter DC supply by wire 161.

In event of resistance element 150 failure or a similar electrical malfunction, a warm propane bottle 149 may be installed, or the bottom of housing 134, below the thermal insulation 132, may be filled with hot water to raise propane temperature.

The propane (LNG) supply unit 112 is shown in detail in FIG. 7 where 2½ gallon propane (LNG) tank 113, a standard unit widely used for many applications, is mounted inside of housing 114 which is insulated by thermal insulating blanket 115. Insulation retaining rings 117, which are formed of split coils of round steel bar, hold the insulating blanket 115 in place by spring action. Propane tank 113 is secured by cover plate 121 which bolts to housing 114 by means of opposed sets of wing nuts 122, washers 123 and studs 124. Bottom plate 119 has central exhaust inlet 118 which admits hot combustion gases conducted from heating unit 25 by exhaust pipe 116 to impinge upon the bottom of propane tank 113, heating its contents. These gases rise around tank 113 to escape through vent holes 129 in cover plate 121 at a temperature in the range of 70-80 degrees F.

In order to keep the propane (LNG) tank 113 warm while the engine 10 is running, warm coolant from a convenient source such as the cab heater circuit is re-routed from cab heater supply connection 23 to coil inlet 125 and coil outlet 127 and thence to cab heater hose 24, going through coil 126, positioned closely around the base of said tank. Keeping the tank 113 warm in this manner allows the heating unit to be fired up without other preparation.

The pressure of propane (LNG) gas escaping from tank 113 is limited by pressure regulator 128 and the gaseous propane (LNG) is carried through supply hose 120 to coldstart unit 130.

Although particular embodiments of the invention have been illustrated in the accompanying Drawings and described in the foregoing Detailed Description, it will be understood that the invention is not limited to the embodiments disclosed, but is capable of rearrangement, modification and substitution of parts and elements without departing from the spirit and scope of the invention as defined in the appended claims.

I claim:

1. Apparatus for heating a liquid cooled internal combustion engine comprising:
   a vertical fire-box having inlet and exhaust flow paths, said exhaust flow path extending downwardly from said fire-box;
   a refractory lining for said fire-box;
   combustion means for producing radiant energy and hot gaseous combustion products in said fire-box inlet flow path so as to heat said refractory lining to incandescence;
   first engine coolant heat exchanging means positioned in said exhaust flow path for cooling said combustion products;
   first connecting means for passing liquid coolant from said engine through said first engine coolant heat exchanging means;
   second engine coolant heat exchanging means above said first engine coolant heat exchanging means, cooperating with said combustion means and said incandescent fire-box for heating said engine coolant;
   second connecting means for passing liquid coolant from said first engine coolant heat exchanging means through said second engine coolant heat exchanging means; and
   third connecting means for returning liquid coolant from said second coolant heat exchanging means to said engine.

2. Apparatus for heating a liquid cooled internal combustion engine in accordance with claim 1 wherein said liquid coolant is passed through said first aid second heat exchanging means by convection.

3. Apparatus for heating a liquid cooled internal combustion engine in accordance with claim 1 wherein said refractory lining is a fiberous ceramic material.

4. Apparatus for heating a liquid cooled internal combustion engine in accordance with claim 1 further comprising:
   fuel heat exchanging means for heating fuel for said engine; and
   pump means for circulating said fuel through said fuel heat exchanging means.

5. Apparatus for heating a liquid coolant internal combustion engine in accordance with claim 1 wherein said combustion means is fueled by liquid natural gas supply means.

6. Apparatus for heating a liquid coolant internal combustion engine in accordance with claim 1 wherein said combustion means comprises:
   fuel supply means;
   a vertically disposed mixing tube having air inlet openings;
   gas jet means for admitting combustible gas into said mixing tube from said fuel supply means;
   venturi means in said mixing tube above said gas jet means for metering the mixture of said combustible gas and air; and
   means for igniting said mixture.

7. Apparatus for heating a liquid coolant internal combustion engine in accordance with claim 5 wherein said liquid natural gas supply means are heated by said combustion products exiting said first engine coolant heat exchanging means.

8. Apparatus for heating a liquid cooled internal combustion engine in accordance with claim 5 wherein said liquid natural gas supply means is heated by engine coolant.

9. Apparatus for heating a liquid cooled internal combustion engine in accordance with claim 5 wherein said liquid natural gas supply means is heated by electrical resistance means.

10. Apparatus for heating a liquid cooled internal combustion engine in accordance with claim 6 wherein said fuel supply means is a liquid natural gas tank.

11. Apparatus for heating a liquid cooled internal combustion engine comprising:
   a vertical fire-box having inlet and exhaust flow paths, said exhaust flow path extending downwardly from said fire-box;
   a refractory lining for said fire-box;
   combustion means for producing radiant energy and gaseous combustion products in said fire-box inlet flow path so as to heat said refractory lining to incandescence;
   first engine coolant heat exchanging means positioned in said exhaust flow path for cooling said combustion products;
   first connecting means for passing liquid coolant from said engine through said first engine coolant heat exchanging means;
   second engine coolant heat exchanging means cooperating with said combustion means and said incandescent fire-box for heating said engine coolant;
   second connecting means for passing liquid coolant from said engine through said second engine coolant heat exchanging means.

12. Apparatus for heating a liquid cooled internal combustion engine in accordance with claim 11 wherein said liquid coolant is passed through said first and second heat exchanging means by convection.

13. Apparatus for heating a liquid cooled internal combustion engine in accordance with claim 11 wherein said refractory lining is a fiberous ceramic material.

14. Apparatus for heating a liquid cooled internal combustion engine in accordance with claim 11 further comprising:
   fuel heat exchanging means for heating fuel for said engine; and
   pump means for circulating said fuel through said fuel heat exchanging means.

15. Apparatus for heating a liquid coolant internal combustion engine in accordance with claim 11 wherein said combustion means is fueled by liquid natural gas supply means.

16. Apparatus for heating a liquid coolant internal combustion engine in accordance with claim 11 wherein said combustion means comprises:
   fuel supply means;
   a vertically disposed mixing tube having air inlet openings;
   gas jet means for admitting combustible gas into said mixing tube from said fuel supply means;
   venturi means in said mixing tube above said gas jet means for metering the mixture of said combustible gas and air; and
   means for igniting said mixture.

17. Apparatus for heating a liquid coolant internal combustion engine in accordance with claim 15 wherein said liquid natural gas supply means are heated by said combustion products exiting said first engine coolant heat exchanging means.

18. Apparatus for heating a liquid cooled internal combustion engine in accordance with claim 15 wherein said liquid natural gas supply means is heated by engine coolant.

19. Apparatus for heating a liquid cooled internal combustion engine in accordance with claim 15 wherein said liquid natural gas supply means is heated by electrical resistance means.

20. Apparatus for heating a liquid cooled internal combustion engine in accordance with claim 16 wherein said fuel supply means is a liquid natural gas tank.

21. A method for heating a liquid cooled internal combustion engine comprising:
   firing a refractory lined fire-box to incandescence;
   passing coolant from said engine through an exhaust heat exchanger;
   establishing convection circulation of said coolant by exposure of said exhaust heat exchanger to gases exhausted from said fire-box so as to cool said exhaust gases and heat said engine coolant;
   passing said coolant upwardly into a fire-box heat exchanger;
   reinforcing convection circulation of said coolant by exposure of said fire-box heat exchanger to the fire and radiated incandescent heat of said fire-box; and
   passing said coolant back into said engine.

22. A method for heating a liquid cooled internal combustion engine in accordance with claim 21 further comprising:
   taking the fuel for said engine from an engine fuel supply tank;
   passing said fuel around the outside of said fire-box so as to warm said fuel; and
   returning said fuel to said engine fuel supply tank.

23. A method for heating a liquid cooled internal combustion engine in accordance with claim 21 further comprising:
   heating the fuel supply for firing said fire-box with the gases exhausted from said exhaust heat exchanger.

24. A method for heating a liquid cooled internal combustion engine in accordance with claim 21 further comprising:
   first running the engine so as to heat the liquid engine coolant;
   circulating said heated coolant in proximity to a liquid natural gas fuel supply for said fire-box so as to maintain said fuel supply in a warm, pressurized state;
   shutting off said engine;
   using said warm, pressurized liquid natural gas to fire said fire-box; and
   finally using the exhaust gases from said fire-box to maintain said fuel supply in a warm, pressurized state.

25. A method for heating a liquid cooled internal combustion engine in accordance with claim 21 further comprising:
   first heating a minimal capacity auxiliary liquid natural gas fuel supply for said fire-box so as to bring said fuel supply to a warm, pressurized state;
   using said warm, pressurized liquid natural gas to fire said fire-box; and
   finally using the exhaust gases from said fire-box to bring a primary liquid natural gas fuel supply for said fire-box to a warm, pressurized state for continuing operation.

26. A method for heating a liquid cooled internal combustion engine comprising:
   firing a refractory lined fire-box to incandescence;
   passing coolant from said engine through an exhaust heat exchanger;

establishing convection circulation of said coolant by exposure of said exhaust heat exchanger to gases exhausted from said fire-box so as to cool said exhaust gases and heat said engine coolant;

passing said coolant back into said engine;

passing other coolant from said engine through a fire-box heat exchanger;

establishing convection circulation of said other coolant by exposure of said heat exchanger to the fire and radiated incandescent heat of said fire-box; and passing said other coolant back into said engine.

27. A method for heating a liquid cooled internal combustion engine in accordance with claim 26 further comprising:

first running the engine so as to heat the liquid engine coolant;

circulating said heated coolant in proximity to a liquid natural gas fuel supply for said fire-box so as to maintain said fuel supply in a warm, pressurized state;

shutting off said engine;

using said warm, pressurized liquid natural gas to fire said fire-box; and finally using the exhaust gases from said fire-box to maintain said fuel supply in a warm, pressurized state.

28. A method for heating a liquid cooled internal combustion engine in accordance with claim 26 further comprising:

first heating a minimal capacity auxiliary liquid natural gas fuel supply for said fire-box so as to bring said fuel supply to a warm, pressurized state;

using said warm, pressurized liquid natural gas to fire said fire-box; and finally using the exhaust gases from said fire-box to bring a primary liquid natural gas fuel supply for said fire-box to a warm, pressurized state for continuing operation.

29. A method for heating a liquid cooled internal combustion engine in accordance with claim 26 further comprising:

taking the fuel for said engine from an engine fuel supply tank;

passing said fuel around the outside of said fire-box so as to warm said fuel; and returning said fuel to said engine fuel supply tank.

30. A method for heating a liquid cooled internal combustion engine in accordance with claim 26 further comprising:

heating the fuel supply for firing said fire-box with the gases exhausted from said exhaust heat exchanger.

31. A method for heating a liquid cooled internal combustion engine comprising:

firing a refractory lined fire-box to incandescence;

passing coolant from said engine through an exhaust heat exchanger;

establishing convection circulation of said coolant by exposure of said exhaust heat exchanger to gases exhausted from said fire-box so as to cool said exhaust gases and preheat said engine coolant;

passing said preheated coolant thence through a fire-box heat exchanger;

maintaining convection circulation of, and further heating said preheated coolant by exposure of said fire-box heat exchanger to the fire and radiated incandescent heat of said fire-box; and passing said heated coolant back into said engine.

32. A method for heating a liquid cooled internal combustion engine in accordance with claim 31 further comprising:

first running the engine so as to heat the liquid engine coolant;

circulating said heated coolant in proximity to a liquid natural gas fuel supply for said fire-box so as to maintain said fuel supply in a warm, pressurized state;

shutting off said engine;

using said warm, pressurized liquid natural gas to fire said fire-box; and finally using the exhaust gases from said fire-box to maintain said fuel supply in a warm, pressurized state.

33. A method for heating a liquid cooled internal combustion engine in accordance with claim 31 further comprising:

first heating a minimal capacity auxiliary liquid natural gas fuel supply for said fire-box so as to bring said fuel supply to a warm, pressurized state;

using said warm, pressurized liquid natural gas to fire said fire-box; and finally using the exhaust gases from said fire-box to bring a primary liquid natural gas fuel supply for said fire-box to a warm, pressurized state for continuing operation.

34. A method for heating a liquid cooled internal combustion engine in accordance with claim 31 further comprising:

taking the fuel for said engine from an engine fuel supply tank;

passing said fuel around the outside of said fire-box so as to warm said fuel; and returning said fuel to said engine fuel supply tank.

35. A method for heating a liquid cooled internal combustion engine in accordance with claim 31 further comprising:

heating the fuel supply for firing said fire-box with the gases exhausted from said exhaust heat exchanger.

* * * * *